(12) United States Patent
Dayton et al.

(10) Patent No.: US 7,500,680 B2
(45) Date of Patent: Mar. 10, 2009

(54) SUSPENSIONS FOR WHEELED TRANSPORT DEVICES

(75) Inventors: Douglas C. Dayton, Lexington, MA (US); Florian Altmann, Cambridge, MA (US)

(73) Assignee: Umagination Labs, L.P., Newton, MA (US)

( * ) Notice: Subject to any disclaimer, the term of this patent is extended or adjusted under 35 U.S.C. 154(b) by 456 days.

(21) Appl. No.: 11/185,316

(22) Filed: Jul. 20, 2005

(65) Prior Publication Data

US 2006/0038366 A1    Feb. 23, 2006

Related U.S. Application Data

(60) Provisional application No. 60/599,510, filed on Aug. 6, 2004.

(51) Int. Cl.
*B62D 21/11*    (2006.01)
(52) U.S. Cl. .......................... 280/37; 280/654; 280/655; 280/655.1; 280/47.17; 280/19.1; 280/47.26; 280/19.3
(58) Field of Classification Search ................... 280/37, 280/654, 655, 655.1, 47.17, 47.26, 19.1, 280/19.3
See application file for complete search history.

(56) References Cited

U.S. PATENT DOCUMENTS

| | | | |
|---|---|---|---|
| 1,875,965 A * | 9/1932 | Waters | ........................ 292/73 |
| 2,738,542 A | 3/1956 | Clark, Jr. | |
| 4,254,850 A | 3/1981 | Knowles | |
| 4,429,897 A | 2/1984 | Friedman et al. | |
| 4,524,482 A | 6/1985 | Mueller | |
| 4,588,055 A | 5/1986 | Chen | |
| 4,685,174 A | 8/1987 | Hager | |
| 4,773,123 A | 9/1988 | Yu | |
| 4,930,806 A | 6/1990 | Walker, Jr. | |
| 5,103,530 A | 4/1992 | Andrisin, III et al. | |
| 5,778,488 A | 7/1998 | Tsai | |

(Continued)

FOREIGN PATENT DOCUMENTS

GB    821874    10/1959

(Continued)

OTHER PUBLICATIONS

U.S. Appl. No. 11/197,023, filed Aug. 4, 2005, entitled "Electrical Power Generation".

(Continued)

*Primary Examiner*—Christopher Ellis
*Assistant Examiner*—Cynthia F. Collado
(74) *Attorney, Agent, or Firm*—Fish & Richardson P.C.

(57) ABSTRACT

A wheeled transport device, such as luggage, a trash can, a garden cart or other hand cart configured to be manually wheeled in an inclined position by a pedestrian user, includes a collapsible handle at one end and wheels at the other end. The wheels are independently connected to the device by respective suspensions that exhibit a compliance, in response to forces applied to their respective wheels by the surface in a direction opposing wheel motion, selected to sufficiently alter suspension geometry to temporarily change an attitude, such as toe, camber or caster, of their respective wheels to counter a tendency of the device to overturn in response to the applied forces.

42 Claims, 5 Drawing Sheets

U.S. PATENT DOCUMENTS

| | | | |
|---|---|---|---|
| 5,813,503 A * | 9/1998 | Chang | 190/18 A |
| 5,921,635 A | 7/1999 | Deliman et al. | |
| 6,360,500 B1 | 3/2002 | Wilcox | |
| 6,367,602 B1 * | 4/2002 | Chang | 190/18 A |
| 6,390,213 B1 | 5/2002 | Bleicher | |
| D465,805 S | 11/2002 | Hu | |
| 6,484,359 B1 * | 11/2002 | Guttmann et al. | 16/18 R |
| 6,568,030 B1 | 5/2003 | Watanabe et al. | |
| 6,604,617 B2 | 8/2003 | Davis et al. | |
| 6,612,411 B2 | 9/2003 | Nykoluk et al. | |
| 6,758,534 B2 | 7/2004 | Lampugnani | |
| 6,769,701 B1 * | 8/2004 | Clausen | 280/37 |
| 7,237,660 B2 * | 7/2007 | Wu | 190/18 A |
| 2004/0000457 A1 | 1/2004 | Sanford-Schwentke | |
| 2004/0094378 A1 | 5/2004 | Gandy | |
| 2004/0154131 A1 | 8/2004 | Earley et al. | |
| 2004/0226135 A1 | 11/2004 | Wang | |

FOREIGN PATENT DOCUMENTS

WO      WO 94/23960      10/1994

OTHER PUBLICATIONS

International Search Report and Written Opinion; PCT/US05/27342; mailed Nov. 14, 2007.

* cited by examiner

SUSPENSIONS FOR WHEELED TRANSPORT DEVICES

CROSS-REFERENCE TO RELATED APPLICATIONS

This application claims the benefit of U.S. Provisional Application No. 60/599,510, filed Aug. 6, 2004 and entitled "Suspensions for Wheeled Transport Devices," which is incorporated by reference herein.

TECHNICAL FIELD

This invention relates to suspensions for wheeled transport devices such as luggage, carts or containers, configured to be manually pulled in an inclined position behind a pedestrian user.

BACKGROUND

Wheeled travel luggage and other hand pulled carts such as wheeled garbage cans and garden carts can create discomfort or injury to the user's hand or arm when the wheels inadvertently strike objects in their path or encounter uneven surfaces or sudden changes in elevation that send shock loads to the handle and into the arm, or in some cases flip over causing a twisting of the hand and arm.

Improvements to such hand-pulled, wheeled devices are desired.

SUMMARY

According to one aspect of the invention, a wheeled transport device, such as a piece of personal luggage configured to be manually wheeled in an inclined position by a pedestrian user, includes a main body defining a compartment for containing goods to be transported, a handle disposed at an upper end of the body when the transport device is in an operative, inclined position, the handle manually graspable by the pedestrian user while walking, and at least two wheels disposed at a lower end of the body when the transport device is in an operative, inclined position. Each of the two wheels is secured to the body by respective suspensions for independent rotation along a surface upon which the user is walking, and each suspension exhibits a compliance, in response to forces applied to its respective wheel by the surface in a direction opposing wheel motion, selected to sufficiently alter a geometry of the suspension to temporarily change an attitude of its respective wheel with respect to the main body to counter a tendency of the wheeled transport device to rotate about its axis of inclination in response to the applied forces.

Preferably, the suspension compliance is sufficient to maintain a center of gravity of the wheeled transport device disposed between contact areas between the wheels and the surface, as the suspension deflects and resumes an equilibrium state in response to an impact force imparted to its respective wheel by traversing a sharp step of 5.0 centimeters in height, at a walking speed of about 4.8 kilometers per hour.

In many cases, the temporarily changed attitude of the respective wheel is its rolling direction. For example, in some cases the suspension is geometrically configured to toe the respective wheel outward in response to the applied forces.

In some other cases, the temporarily changed attitude of the respective wheel is its camber or its caster.

In some configurations, each suspension and its respective wheel is detachable as a unit from the main body.

In some embodiments, each suspension includes a spring to store energy imparted by the applied forces, and a damper to dissipate energy imparted by the applied forces. The damper has an adjustable resistance to suspension deflection in some example, and in some cases the spring is adjustable. In some versions the spring is a leaf spring.

In some cases, the device is advantageously provided with multiple, interchangeable suspensions of differing properties.

In some embodiments, the suspension includes an elastomeric travel stop positioned to limit suspension deflection.

Some examples also include a wheel-driven electric generator that generates electrical power while the device is wheeled along the surface.

In some cases, the wheels themselves provide the suspension resilience, and the device may be provided with multiple, interchangeable wheels of differing properties.

In many versions, the handle is collapsible for storage, such as by telescoping motion. In some particularly advantageous embodiments, the wheels are interconnected to the collapsible handle, such that the wheels are automatically retracted when the handle is collapsed.

Various aspects of the invention feature a hand-pulled/ pushed transport device, such as a suitcase, trash can, garden cart, hand cart or any other device, that is supported by at least two wheels connected to the transport device by a linkage system that allows wheel movement in response to impact loads to the wheels. The linkage system preferably has a pivoting attachment to the body of the transport device and the loads imparted to the wheel and linkage are transmitted to the body of the transport device by a spring and damper combination that dissipates at least some of the imparted energy. When a wheel of the transport device encounters an obstacle, the force of the impact is preferably absorbed and dissipated by a spring/damper system, such that less kinetic energy is transferred to the main body of the transport device, reducing the tendency to deviate from the travel path or turn about the long (i.e., inclined) axis of the device. To the extent that the energy of impact causes compression of the spring, the linkage preferably controls wheel movement in a deliberate way so that the wheel moves along a path that increases negative camber and increases toe-out which action causes the wheel to move the transport device in the direction that encourages the center of gravity of the device to stay within the wheelbase of the device, thus reducing the tendency toward overturning.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
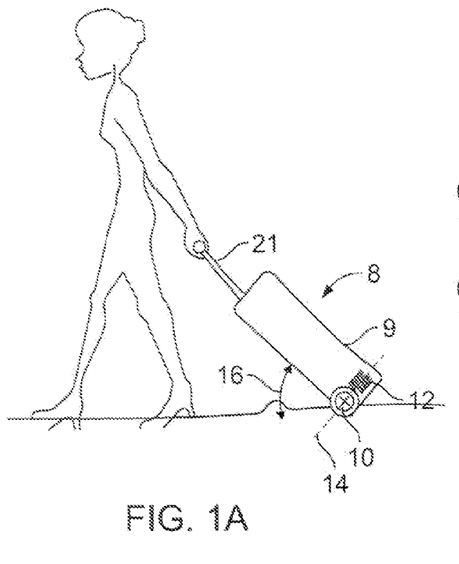
FIG. 1A is a side views of a wheeled transport device as pulled by a person.
Figure 1B:
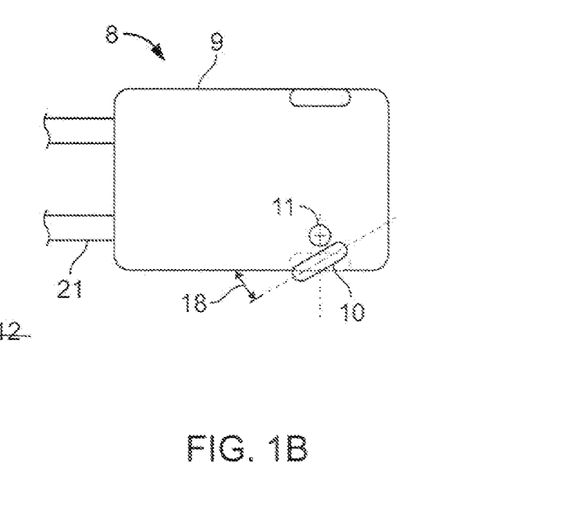
FIGS. 1B and 1C are top and rear views, respectively, showing movement of the near wheel of FIG. 1A in response to hitting a bump.
Figures 1C, 1D:
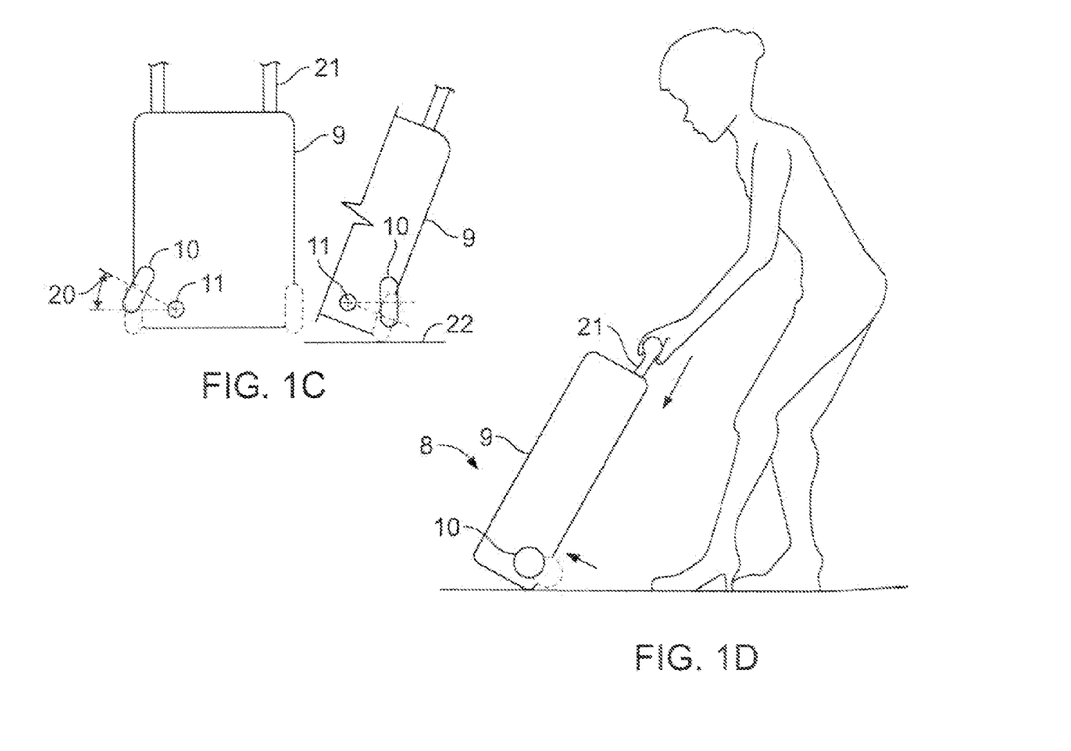
FIG. 1D illustrates retracting luggage wheels by collapsing an extendable luggage handle.

Referring to FIG. 1A, many two-wheeled, human-powered, pull/push carts, luggage or the like can be rendered unsteady, uncomfortable or overturned by impacts to the wheels caused by rough surfaces, obstructions and/or sudden changes in elevation, such as stairs and curbs, particularly when the impact is to one wheel only, causing an upward motion on that corner and a torque around the pulling axis of the device, which can cause overturning. In the two-wheeled luggage 8 shown, as one wheel 10 hits a bump, the spring and damper 12 of the suspension connecting that wheel to the main luggage body 9 absorb some of the impact load imparted to the device by the bump. Furthermore, referring also to FIG. 1B, when the spring 12 is compressed and the single-pivot axle moves rearward, rotating about axle pivot 11 along the plane of inclination, perpendicular to line 14, the suspension is configured to move the wheel to toe the wheel outward, increasing the wheel's toe-out angle 18. The plane of inclination is defined as the plane passing through the wheel/ground contact patch and the handle, in side view, forming an inclination angle 16 with respect to the ground plane of about 45 degrees plus or minus 15 degrees, depending upon luggage dimensions and handle height during rolling. As depicted in FIG. 1C, the wheel is controlled to provide negative camber angle 20 as viewed from the rear. This change in wheel attitude helps to prevent overturning of the device by redirecting the wheels under the center of gravity. The change of wheel attitude occurs on both sides of the device, as the uplift created by the force of the bump on one wheel transfers weight to the opposite wheel, compressing that spring as well. As the device rolls about the longitudinal pulling axis, the negative camber of the wheel that remains in contact with the ground has the positive effect of keeping the wheel more perpendicular to the ground surface 22, while the toe-out moves the whole device away from the point of upward deflection and in the surface direction corresponding to the angular direction of the torque couple, thereby keeping the center of gravity between the wheels, whereas if it moves outside either wheel the device will overturn. The illustrated embodiment depicts the plane of the axle movement as parallel to the bottom side of the luggage, which makes for an advantageously compact configuration, helping to minimize reductions in cargo space to accommodate suspension components and movement.

FIG. 1D shows the preparation of a piece of luggage for storage, where collapsing the handle 21 of the luggage retracts the wheels 10 inside the outer faces of the luggage, making for a more compact storage configuration that permits more space internal to the luggage.

Figure 2:
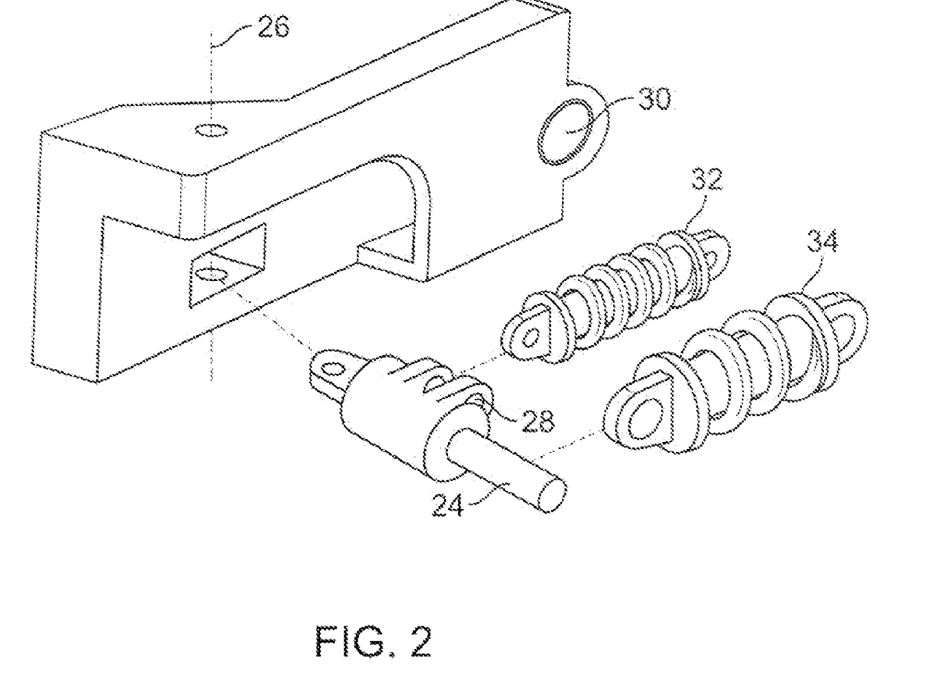
FIG. 2 is an exploded view of a first wheel suspension configuration.

FIG. 2 shows one of many possible solutions to supporting a range of loads imposed on the luggage or other transport device, by interchangeable spring/damper units. The axle 24 that carries the wheel is mounted on the luggage body to pivot about a pivot axis 26. Axle 24 has mounting bosses 28 to which one of multiple interchangeable spring/damper units, including a light spring/damper 32 and a heavy spring/damper 34, can be selectively mounted for rotation about an axis perpendicular to axis 26, but that also allow for some movement about other axes so as to allow the misalignment caused by motion through an arc as dictated by the overall geometry. The body of the luggage or other transport device provides a similarly misalignment-tolerant pivot 30 at which an opposite end of the spring/damper is mounted. Thus, springs/damper units may be originally selected, replaced or interchanged to configure the luggage for a particular loading and/or intended use.

Figure 3:
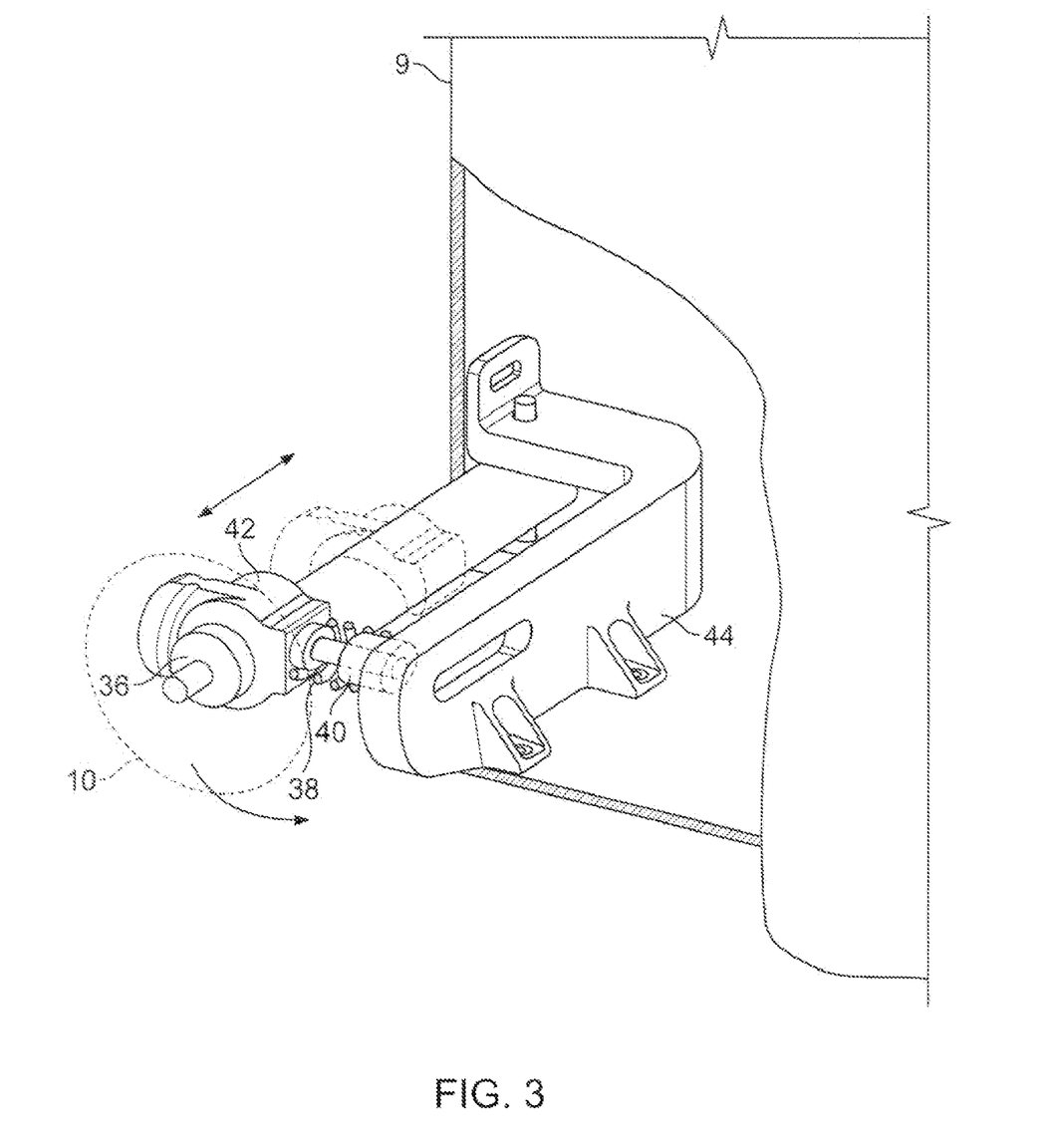
FIG. 3 is a perspective view of a second wheel suspension configuration.

FIG. 3 shows another of many possible solutions to supporting a range of loads imposed on the luggage or other transport device, by interchangeable spring/damper units. In this case, the axle 36 that carries the wheel 10 pivots on a sub-frame 44 secured to the luggage body 9. Sub-frame 44 is modular and may be fitted to numerous variations of transport devices. The spring/damper 38 includes a bump stop device 40 that provides a resilient overload stop, and is mounted to a carrier 42 that can be selectively positioned in any of several spaced-apart positions along the axle, so as to provide greater or lesser mechanical advantage to the spring of the spring/damper assembly, thus providing tuneability of the system to accommodate a large range of loads.

Figure 4:
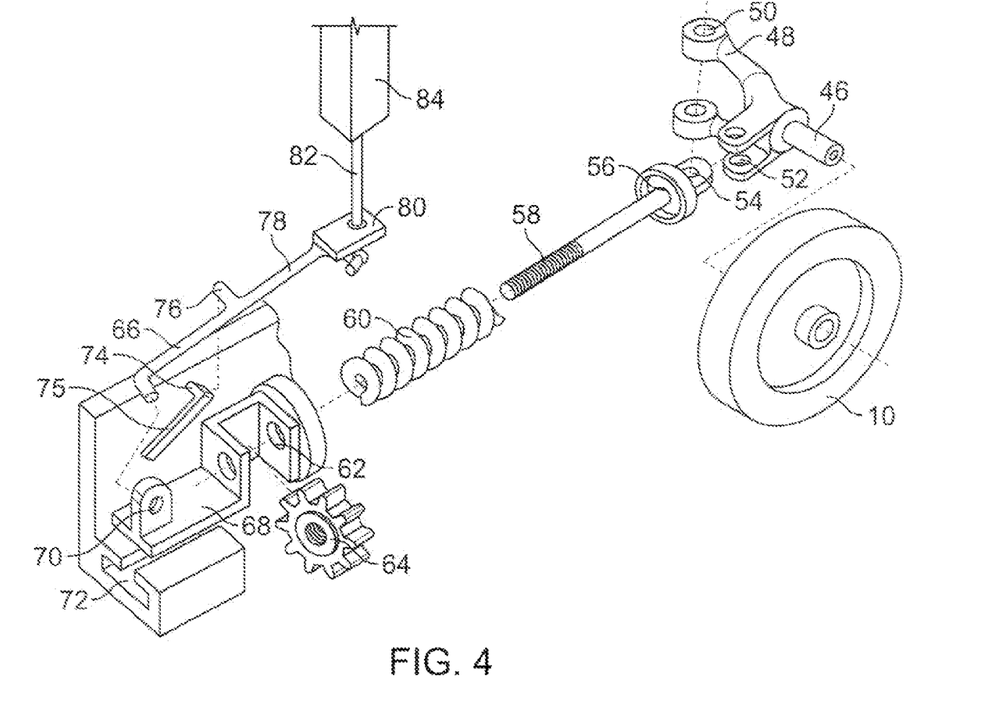
FIG. 4 is an exploded view of a third wheel suspension configuration, with means for retracting the wheel.

FIG. 4 shows a suspension system configured to provide a spring damper system for a piece of luggage as previously described, but that also retracts the entire wheel system when the handle of the luggage is collapsed to the stored position as shown in FIG. 1D. As in the above embodiments, the luggage or other transport device with a collapsing handle is supported by two wheels 10 rotating on an axle 46 and has the wheels connected to the main body of the luggage by a pivoting knuckle 48 that allows wheel axle pivoting about a linear pivot axis 50 in response to impact loads to the wheels. Loads imparted to the wheel and knuckle are transmitted to the body of the transport device by a spring 60 and damper 62 combination that dissipates at least some of the imparted energy. When wheel 10 encounters an obstacle, force of the impact is absorbed and dissipated by the spring/damper system and less energy is imparted to the main body of the transport device, reducing the tendency to deviate from the travel path or turn on the long axis of the device. To the extent that the energy of impact causes compression of the spring, the linkage controls wheel movement in a way predetermined to cause the wheel to move along a path that increases negative camber and increases toe-out, causing the wheel to move the transport device in the direction that encourages the center of gravity of the device to stay within the wheelbase of the device. The spring/damper combination is contained by a seat 56 and a spindle 58 that pivots on the knuckle, extends through holes 62 defined in mounting block 68, and is threaded into an adjusting wheel, allowing for adjustment of spring assembly preload. Mounting block 68 travels is free to travel along a track 72 defined in the main luggage body, and is pinned to locating arm 66 at hole 70. Arm 66 is attached to an extendable telescoping arm 84 of the pulling handle assembly of the transport device. When this arm 84 is pushed inward to its storage position, the bottom of the arm pushes down on the platform end 80 of the locating arm, disengaging the detent pin 76 from its locked position 74 along pin track 75 and enabling the locating arm to slide rearward, permitting the carriage 68 to also move rearward, followed by the entire spring/damper assembly and axle 46, such that the wheel 10 is retracted into a cavity of the transport device body.

Figure 4A:
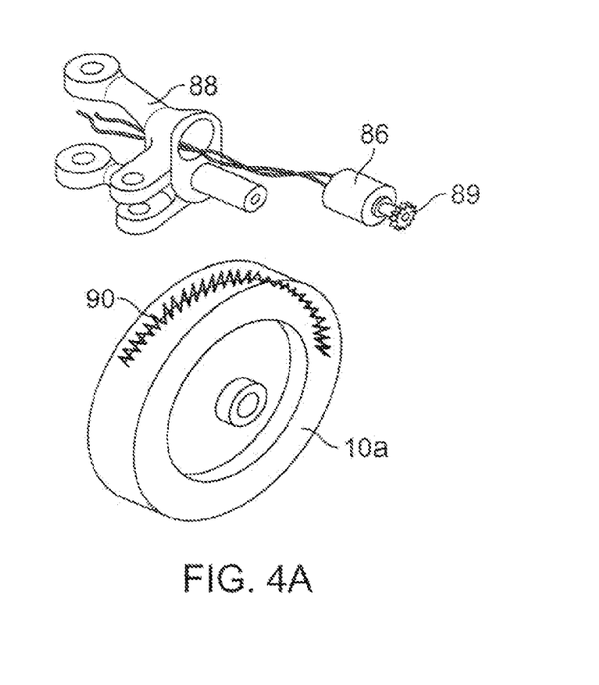
FIG. 4A illustrates a wheel-driven generator.

Referring to FIG. 4A, electrical generator 86 is mounted in the body of the pivoting knuckle 88 and is driven by a spur gear 89 that engages gear teeth 90 internal to road wheel 10a. It is also possible to mount the generator within the body of the luggage or transport device and drive it by a rotating axle internal to the linkage.

Figure 5:
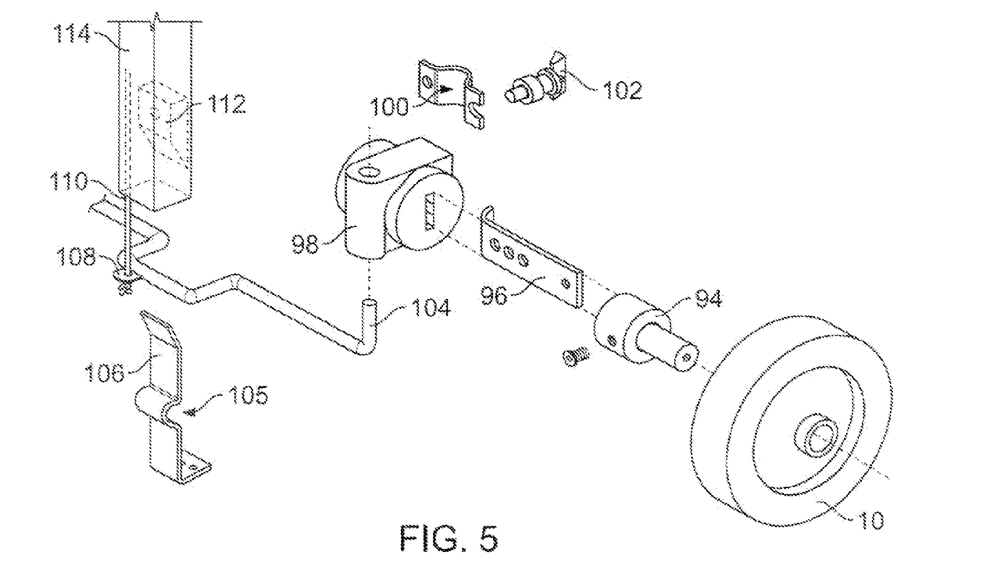
FIG. 5 is an exploded view of a fourth wheel suspension configuration, with means for retracting the wheel.

FIG. 5 shows an alternative suspension system for a piece of wheeled luggage employing a leaf spring rather than a coil spring and providing the ability to tune the system for varying loads, as well as providing retraction of the entire wheel system when the handle of a piece of luggage is collapsed to the stored position. The luggage is supported by two wheels 10 rotating on respective axles 94 connecting the wheels to the transport device by leaf springs 96 that constrain wheel movement along a linear pivot axis by trapping the spring in carrier hub 98. The leaf spring is located by a detent pin 102 that the user can engage in various holes in the spring to adjust the spring rate. The detent pin is held in engagement by a second leaf spring 100 or other similar mechanism. The entire wheel/hub assembly is positioned by a rigid rod 104 that has a pivoting attachment to the body of the transport device. The location of the wheel inboard or outboard of the body of the luggage is dependent on the angular position of the rigid rod linkage. With rod 104 releasably engaged in a recess 105 in spring clip 106, the wheel is outboard in the transit position. When the extendable telescoping arm 114 of the pulling handle assembly is pushed down, a cam block 112 disengages spring 106 and pushes the rigid rod 104 through an arc, retracting the wheel assembly. When the extendable telescoping arm is pulled out, a flexible cord 110 pulls up on the crank portion 108 of rod 104, returning the rod into releasably engagement within recess 105 of spring 106 and pivoting the unloaded wheel assembly again into the outboard transit mode.

Figure 6:
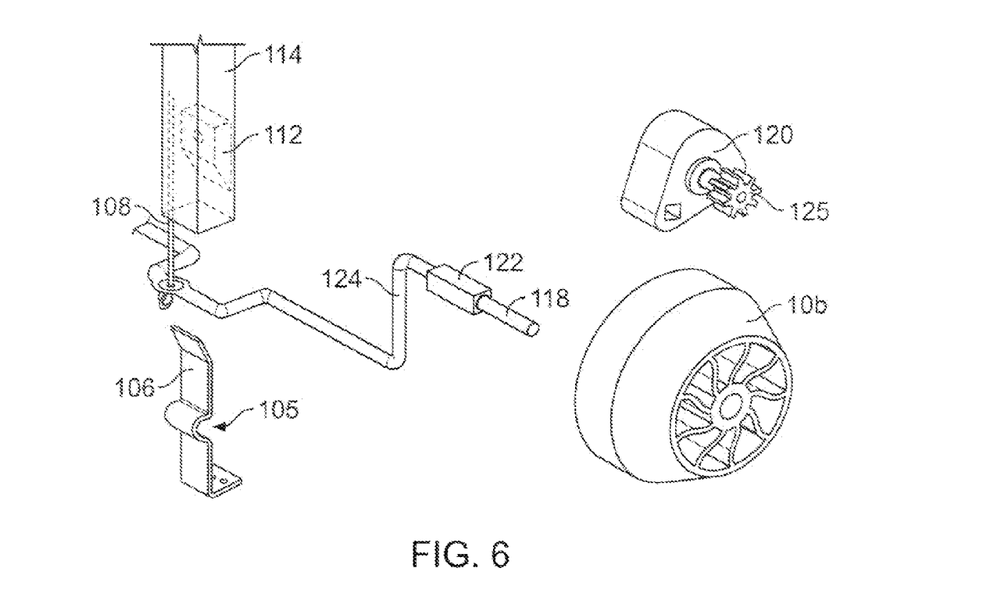
FIG. 6 is an exploded view of a fifth wheel suspension configuration, with means for retracting the wheel.

FIG. 6 shows an alternative suspension system for a piece of wheeled luggage, employing an elastomeric wheel 10b with molded internal ribs that resiliently deform when loaded, both providing effective springing of the load and providing damping of the system. These wheels are preferably interchangeable and each designed to accommodate a different load range. The luggage is supported by two such wheels, each rotating on an axle 118 connected to the transport device by a rigid rod linkage 124 that has a pivoting attachment to the body of the transport device. As with the embodiment of FIG. 5, the location of the wheel inboard or outboard of the body of the luggage is dependent on the angular position of the rigid rod linkage, and similar means are provided for extending and retracting the wheels. Electrical generator 120 is mounted on a square portion 122 of rigid rod linkage 124 and is driven by a spur gear 125 that engages a rigid gear (not shown) internal to the elastomeric wheel 116. It is also possible to mount the generator within the body of the luggage or transport device and drive it by a rotating axle internal to the linkage. Further details of wheel-driven generators can be found in U.S. patent application Ser. No. 60/599,360, filed on Aug. 6, 2004 and entitled "ELECTRICAL POWER GENERATION," the entire contents of which are incorporated herein by reference.

A number of embodiments of the invention have been described. Nevertheless, it will be understood that various modifications may be made without departing from the spirit and scope of the invention. Accordingly, other embodiments are within the scope of the following claims.

What is claimed is:

1. A wheeled transport device configured to be manually wheeled in an inclined position by a pedestrian user, the transport device comprising:
    a main body defining a compartment therein for containing goods to be transported;
    a handle disposed at an upper end of the body when the transport device is in an operative, inclined position, the handle manually graspable by the pedestrian user while walking; and
    at least two wheels disposed at a lower end of the body when the transport device is in an operative, inclined position, each of the two wheels secured to the body by respective suspensions for independent rotation along a surface upon which the user is walking;
    wherein each suspension is geometrically configured to toe its respective wheel with respect to the main body to alter a rolling direction of the respective wheel and counter a tendency of the wheeled transport device to rotate about its axis of inclination in response to forces applied to the respective wheel by the surface in a direction opposing wheel motion.

2. The wheeled transport device of claim 1 wherein the suspensions are configured to maintain a center of gravity of the wheeled transport device disposed between contact areas between the wheels and the surface, as the suspension deflects and resumes an equilibrium state in response to an impact force imparted to its respective wheel by traversing a sharp step of 5.0 centimeters in height, at a walking speed of about 4.8 kilometers per hour.

3. The wheeled transport device of claim 1, wherein each suspension is geometrically configured to alter wheel camber of the respective wheel.

4. The wheeled transport device of claim 1, wherein each suspension is geometrically configured to alter wheel caster of the respective wheel.

5. The wheeled transport device of claim 1, wherein each suspension and its respective wheel is detachable as a unit from the main body.

6. The wheeled transport device of claim 1, wherein each suspension comprises a spring to store energy imparted by the applied forces, and a damper to dissipate energy imparted by the applied forces.

7. The wheeled transport device of claim 6, wherein the damper has an adjustable resistance to suspension deflection.

8. The wheeled transport device of claim 6, wherein the spring is adjustable.

9. The wheeled transport device of claim 6, wherein the spring comprises a leaf spring.

10. The wheeled transport device of claim 1, in combination with multiple, interchangeable suspensions of differing properties.

11. The wheeled transport device of claim 1, wherein the suspension includes an elastomeric travel stop positioned to limit suspension deflection.

12. The wheeled transport device of claim 1, further comprising a wheel driven electric generator that generates electrical power while the device is wheeled along the surface.

13. The wheeled transport device of claim 1, wherein the wheels have resilient outer members that directly contact the surface upon which the device is wheeled.

14. The wheeled transport device of claim 1, in combination with multiple, interchangeable wheels of differing properties.

15. The wheeled transport device of claim 1, wherein the handle is collapsible for storage.

16. The wheeled transport device of claim 15, wherein the handle is telescoping.

17. The wheeled transport device of claim 15, wherein the wheels are interconnected to the collapsible handle, such that the wheels are retracted when the handle is collapsed.

18. A wheeled transport device configured to be manually wheeled in an inclined position by a pedestrian user, the transport device comprising:
    a main body defining a compartment therein for containing goods to be transported;

a handle disposed at an upper end of the body when the transport device is in an operative, inclined position, the handle manually graspable by the pedestrian user while walking; and at least two wheels disposed at a lower end of the body when the transport device is in an operative, inclined position, each of the two wheels secured to the body by respective suspensions for independent rotation along a surface upon which the user is walking;

wherein each suspension includes an elastomeric travel stop positioned to limit suspension deflection and exhibits a compliance, in response to forces applied to its respective wheel by the surface in a direction opposing wheel motion, selected to sufficiently alter a geometry of the suspension to temporarily change an attitude of its respective wheel with respect to the main body to counter a tendency of the wheeled transport device to rotate about its axis of inclination in response to the applied forces.

19. A wheeled transport device configured to be manually wheeled in an inclined position by a pedestrian user, the transport device comprising:

a main body defining a compartment therein for containing goods to be transported;

a handle disposed at an upper end of the body when the transport device is in an operative, inclined position, the handle manually graspable by the pedestrian user while walking and being collapsible for storage; and at least two wheels disposed at a lower end of the body when the transport device is in an operative, inclined position, each of the two wheels secured to the body by respective suspensions for independent rotation along a surface upon which the user is walking;

wherein each suspension exhibits a compliance, in response to forces applied to its respective wheel by the surface in a direction opposing wheel motion, selected to sufficiently alter a geometry of the suspension to temporarily change an attitude of its respective wheel with respect to the main body to counter a tendency of the wheeled transport device to rotate about its axis of inclination in response to the applied forces;

wherein the wheels are interconnected to the collapsible handle, such that the wheels are retracted when the handle is collapsed.

20. The wheeled transport device of claim 18, wherein the temporarily changed attitude of the respective wheel comprises rolling direction.

21. The wheeled transport device of claim 20, wherein the suspension is geometrically configured to toe the respective wheel outward in response to the applied forces.

22. The wheeled transport device of claim 18, wherein the temporarily changed attitude of the respective wheel comprises wheel camber.

23. The wheeled transport device of claim 18, wherein the temporarily changed attitude of the respective wheel comprises wheel caster.

24. The wheeled transport device of claim 18, wherein each suspension and its respective wheel is detachable as a unit from the main body.

25. The wheeled transport device of claim 18, in combination with multiple, interchangeable suspensions of differing properties.

26. The wheeled transport device of claim 18, further comprising a wheel-driven electric generator that generates electrical power while the device is wheeled along the surface.

27. The wheeled transport device of claim 18, wherein the wheels have resilient outer members that directly contact the surface upon which the device is wheeled.

28. The wheeled transport device of claim 18, in combination with multiple, interchangeable wheels of differing properties.

29. The wheeled transport device of claim 18, wherein the handle is collapsible for storage.

30. The wheeled transport device of claim 29, wherein the handle is telescoping.

31. The wheeled transport device of claim 29, wherein the wheels are interconnected to the collapsible handle, such that the wheels are retracted when the handle is collapsed.

32. The wheeled transport device of claim 19, wherein the temporarily changed attitude of the respective wheel comprises rolling direction.

33. The wheeled transport device of claim 32, wherein the suspension is geometrically configured to toe the respective wheel outward in response to the applied forces.

34. The wheeled transport device of claim 19, wherein the temporarily changed attitude of the respective wheel comprises wheel camber.

35. The wheeled transport device of claim 19, wherein the temporarily changed attitude of the respective wheel comprises wheel caster.

36. The wheeled transport device of claim 19, wherein each suspension and its respective wheel is detachable as a unit from the main body.

37. The wheeled transport device of claim 19, in combination with multiple, interchangeable suspensions of differing properties.

38. The wheeled transport device of claim 19, wherein the suspension includes an elastomeric travel stop positioned to limit suspension deflection.

39. The wheeled transport device of claim 19, further comprising a wheel-driven electric generator that generates electrical power while the device is wheeled along the surface.

40. The wheeled transport device of claim 19, wherein the wheels have resilient outer members that directly contact the surface upon which the device is wheeled.

41. The wheeled transport device of claim 19, in combination with multiple, interchangeable wheels of differing properties.

42. The wheeled transport device of claim 19, wherein the handle is telescoping.

* * * * *

UNITED STATES PATENT AND TRADEMARK OFFICE
CERTIFICATE OF CORRECTION

PATENT NO. : 7,500,680 B2
APPLICATION NO. : 11/185316
DATED : March 10, 2009
INVENTOR(S) : Douglas C. Dayton

It is certified that error appears in the above-identified patent and that said Letters Patent is hereby corrected as shown below:

Claim 2, column 6, line 19:
   delete "5.0centimeters" and replace with --5.0 centimeters--.

Claim 12, column 6, line 48:
   delete "wheel driven" and replace with --wheel-driven--.

Signed and Sealed this

Fifth Day of May, 2009

JOHN DOLL
*Acting Director of the United States Patent and Trademark Office*